United States Patent [19]

Walter

[11] Patent Number: 5,718,764
[45] Date of Patent: Feb. 17, 1998

[54] APPARATUS FOR COATING SOLID PARTICLES

[75] Inventor: Kim Walter, Lupsingen, Switzerland

[73] Assignee: Aeromatic-Fielder AG, Budendorf, Switzerland

[21] Appl. No.: 379,445

[22] PCT Filed: Jan. 27, 1995

[86] PCT No.: PCT/DK95/00040
§ 371 Date: Mar. 7, 1995
§ 102(e) Date: Mar. 7, 1995

[87] PCT Pub. No.: WO95/20432
PCT Pub. Date: Aug. 3, 1995

[30] Foreign Application Priority Data

Jan. 27, 1994 [CH] Switzerland ............ 00241-94

[51] Int. Cl.$^6$ ............................................ B05C 5/00
[52] U.S. Cl. .......................... 118/303; 118/20; 118/24; 118/62
[58] Field of Search ................. 118/19, 20, 21, 118/24, 62, 303; 406/194

[56] References Cited

U.S. PATENT DOCUMENTS

| 3,110,626 | 11/1963 | Larson et al. | 118/303 |
| 3,241,520 | 3/1966 | Lindlof et al. | 118/62 |
| 4,117,801 | 10/1978 | Dannelly et al. | 118/20 |
| 4,489,504 | 12/1984 | Hammer | 34/10 |
| 4,858,552 | 8/1989 | Glatt et al. | 118/19 |

FOREIGN PATENT DOCUMENTS

| 645035 | 9/1984 | Germany | 34/10 |
| WO 93/08923 | 4/1993 | Germany. | |
| 563 402 | 6/1993 | Germany. | |

OTHER PUBLICATIONS

Ghebre–Sellassie: Pharmaceutical Pelletizing Technology, pp. 50–55 and 68–69.

*Primary Examiner*—Donald E. Czaja
*Assistant Examiner*—Calvin Padgett
*Attorney, Agent, or Firm*—Armstrong, Westerman, Hattori, McLeland & Naughton

[57] ABSTRACT

An apparatus for coating discrete solid particles has one or more coating units, each comprising an upward directed nozzle (5), an annular opening (6) around the nozzle, wall means (7), such as a vertical pipe, above the opening but spaced therefrom, and gas guiding walls (9) below the annular opening for accelerating a gas stream flowing towards said opening. Between said guiding walls, means (10) are arranged for imparting a swirling flow to said gas stream. Thereby the particles are coated while being conveyed in a swirling gas flow. The coating quality is improved and operation facilitated.

13 Claims, 7 Drawing Sheets

FIG. I

APPARATUS FOR COATING SOLID PARTICLES

This application is a 35 U.S.C. 371 of PCT/DK95/00040 filed Jan. 27, 1995.

1. Field of the Invention

Coating of particulate materials is applied within various industries. Thus, for instance, in the pharmaceutical industry drug-containing tablets and pellets are provided with a coating. Thereby it is achieved that the active drug is released delayed after administration. This makes it possible to have the active substance released in specific areas of the intestine or to achieve a prolonged release of the active substance.

In the detergent industry an enzyme layer is provided on a carrying core of extender, which layer is protected against oxidation and attrition by a coating.

Also fertilizers, plant protecting agents, and several other chemical products are coated.

2. Background of the Invention and Prior Art

Special plants and apparatuses have been developed for coating purposes.

One embodiment of this prior art apparatuses comprises a cylindric reaction chamber having a perforated base plate and a spray nozzle in the top of the reaction chamber. By means of pressurized air blown through the base plate a fluidized layer of particles is maintained on said plate and the particles are wetted by the coating liquid which is atomized through the spray nozzle. To achieve the desired degree of encapsulation, uniformity and thickness of the coating layer it is necessary to circulate the batch of particles to be coated for a period between 0.5 and 24 hours. This type of apparatus has the drawback that the capacity is small, an agglomeration and sticking together of the particles is often experienced.

In an improved version of such an apparatus (see WO93/08923 and Ghebre-Sellassie, Isaac: Pharmaceutical Pelletizing Technology, New York and Basel, page 50 and thereafter) important constructive changes have been made. The spray nozzle is placed in the center of the base plate, and spraying of the coating liquid is only made in the direction of the main streams. Around the spray nozzle the base plate has in an annular area a higher perforation due to several larger apertures placed close to each other. The area more distant from the nozzle is perforated only to a minor degree; it has less and smaller apertures. Above the spray nozzle a vertical coating pipe is mounted in such a way that a narrow passage remains between the end of the pipe and the base plate. The diameter of the coating pipe corresponds to the diameter of the area having more pronounced perforation.

Thereby an annular down-flow bed is formed in the reaction chamber between the wall of the reaction chamber and the coating pipe, and a coating zone is formed in and above the coating pipe. The outer annular portion of the base plate is the bottom of the down-flow bed. Due to the only moderate perforation in the outer annular area, the amount of air penetrating the base plate in this section is smaller than the one passing through the interior portion below the coating pipe. Therefore, the column of particles which collects in the down-flow bed zone is only aereated by the weaker air-stream coming from below. On the contrary the stronger stream of air entering the coating pipe carries the particles coming from the down-flow bed upwards through the cloud of atomized droplets.

Thereby a more uniform coating of the particles is obtained, and the risk for agglomeration is decreased since the particles falling back into the down-flow bed after having passed through the cloud of atomized droplets have been predried and therefore have a lower tendency to stick together. However, with this apparatus only a limited production capacity can be obtained, making the apparatus unsuitable for treating large amounts of products, as necessary for instance in the detergent industry. Increase of capacity by increase of the amount of coating liquid sprayed through the nozzle involves an increased risk of agglomeration.

Agglomeration not only impedes product quality but causes operational problems due to partial or complete clogging of the particle flow into and through the coating pipe.

Also this type of prior art apparatus presents certain operational problems. Due to unpredictable flow conditions in certain areas in the peripheral bottom zone in the coating pipe and below said pipe a certain accumulation of particles occasionally or regularly takes place, resulting in an uneven or pulsating flow pattern for the air and particle flow through the coating pipe, which in turn prevents the desired even treatment of all particles and results in clogging of the nozzle.

An accumulation of too many particles in the coating pipe may also result in a complete blocking thereof.

To reduce the risk for such a blocking an apparatus has been developed having no coating pipe but a special spray nozzle (see EP-A-563402). By means of pressurized air the material to be coated is blown out from the center of the spray nozzle. Concentric in relation to the central opening of the nozzle is provided an annular nozzle slot for delivering the coating liquid and pressurized air in an inward direction. This design substantially removes the risk for blocking and sticking of the particles to the inner wall of the reaction chamber. However, the capacity and product quality is still far from satisfactory. Besides, his apparatus is only suitable for treating a limited range of products.

U.S. Pat. No. 3,110,626 discloses a coating apparatus having the zone around the coating pipe at the spray nozzle made in a special way. The reaction chamber has a conically downward tapering shape and has a pipe-like member. In this member the coating pipe is mounted in such a way that a slot between the wall of the member and the coating pipe is available for the recirculation of the coated particles. At the level of the coating pipe the member narrows conically in the downstream direction and continues as a narrow cylindrical pipe portion which again broadens conically to a larger diameter. A spray nozzle axial to the coating pipe debouches in the cylindric pipe portion. A stream of air is conducted cocurrently to the spray direction from below through the pipe portion, which stream entrains the particles to be coated coming from the slot between the walls of said member and the coating pipe.

While being entrained by the gas stream through the coating pipe the particles are wetted by the atomized coating liquid.

In this apparatus the risk for agglomeration is reduced, however, the capacity is moderate. Besides, the quality of the coating is not satisfactory because the particles become coated rather unevenly since they arrive to and pass through the cloud of atomized coating liquid at rather unequal conditions.

SUMMARY OF THE INVENTION

Therefore, there is a need for a coating apparatus which, while having a maximum efficiency of coating, produces a high-quality product with a very uniform coating layer, at the same time enabling a very stable operation without blocking or pulsating flow pattern. Especially when a multiplicity of nozzles with appertaining coating pipes are mounted in a single apparatus with common base plate, it is important that the flow in each coating pipe is uniform and stable to ensure a uniform treatment of all particles.

It is, therefore, and object of the present invention to provide an apparatus fulfilling the above need. And accordingly the invention deals with an apparatus for coating solid particles having within a housing a base plate which may be plane or have a different shape, a nozzle substantially at the level or said plate for discharging an upward spray of coating liquid, a rotation symmetrical wall positioned with the axis thereof in line with and vertically above said nozzle, which a wall is spaced from said base plate, and means for providing an upward gas flow through the space defined by said wall, which apparatus is characterized in that the means for providing said upward gas flow comprise an annular aperture between the base plate and the nozzle, gas guiding walls below the base plate fitting to the edge of the annular aperture and defining a rotation symmetrical space having downward expanding horizontal cross-section area, said gas guiding walls being placed in or debouching in a chamber connected to a source of gas at higher pressure than the pressure existing above the base plate, and mounted between said gas guiding walls and a distance from said annular aperture at a location where the horizontal cross-section area is substantially larger than the area of the annular aperture, means for imparting a swirling movement to an accelerating flow of gas, streaming upward between the guiding walls and through the annular aperture.

By this construction it is achieved that the stream of gas by which the particles to be coated are carried upwards through the coating pipe and which serves as drying air for the coating liquid, when passing the annular aperture around the nozzle and during the continued upward passage through the wall means forming a coating pipe has a swirling flow of relative high velocity.

It is an important feature that the stream of gas, due to the shape of the guiding walls below the base plate, is accelerated during its passage from the swirl imparting means and the annular passage between the nozzle and the base plate. Thereby, turbulence created by the swirl-imparting means is removed and a high velocity flow can be established under essentially laminar conditions.

It has turned out that such controlled upstream conditions for the flow are beneficial for a smooth operation without occurance of partial plugging or pulsating or catchy movement of the particles through the cloud of atomized coating liquid with resulting non-uniform coating.

Other advantages of the apparatus according to the invention will be evident from the explanation below in which reference is made to the drawing.

BRIEF DESCRIPTION OF THE DRAWINGS

On the Figures similar parts or members have been allotted the same reference numerals even when slight variations occur in their presentation.

Referring now to FIG. 1 a coating apparatus is depicted, having a housing 1 in which a base plate 2 is fixed. The base plate divides the apparatus into an upper coating chamber 3 and a plenum 4. In the center of the base plate an upward directed nozzle 5 is arranged. In the depicted embodiment the nozzle is a two-fluid nozzle, but also a pressure nozzle may be used.

The nozzle is placed in a circular hole in the base plate of substantial larger diameter than the outer diameter of the nozzle, whereby an annular aperture 6 is formed around the nozzle.

Figure 1:
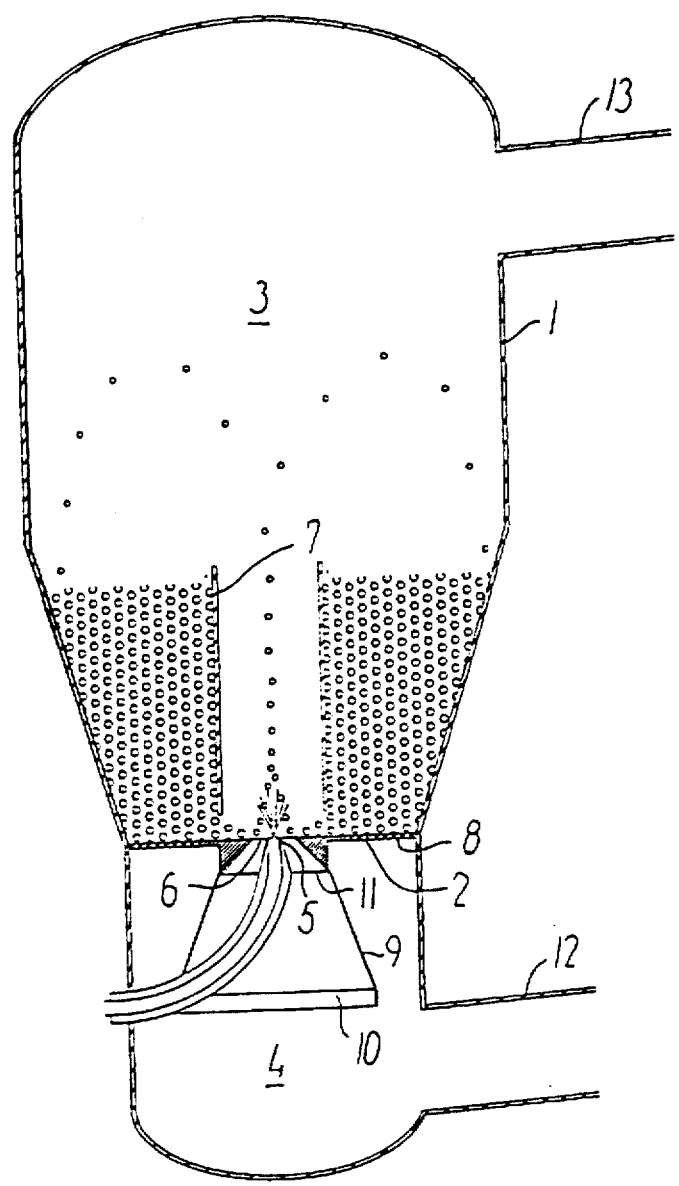
FIG. 1 is a schematic, vertical section through an embodiment of the apparatus according to the invention.

As an alternative to the horizontal base plate shown in FIG. 1 the base plate can be funnel-shaped and form part of a venturi-like design as the one used in U.S. Pat. No. 3,110,626, incorporated herein by reference.

Above the nozzle, wall means 7 are positioned. In the embodiment shown said wall means consist of a pipe, but also other shapes come into consideration as long as the walls define a rotation symmetrical body.

The pipe 7 is positioned a certain distance from the base place. Preferably, said distance is adjustable.

The embodiments of the apparatus shown in FIGS. 1–7 are intended for batch operation in which the particles to be coated pass repeatedly through the coating pipe. However, the principle of the invention as defined above may also be utilized in connection with continuous operating in which the particles only pass once through the coating pipe.

In the embodiment shown, perforations 8 exist in the portion of the base plate somewhat outside the area below the wall or pipe 7.

As an alternative to a horizontal base plate this may, in a perforated or non-perforated version thereof, be of conical shape or have other shape slanting towards the aperture 6.

Below the base plate, gas guiding walls 9 are provided. These walls define a rotation symmetrical space having downward expanding horizontal cross-section area. The gas guiding walls may typically be shaped as a downward expanding conus, but other shapes may be preferred, provided they are rotation-symmetrical and have a downward expanding cross-section area.

At the lower part of the gas guiding walls 9, means 10 for imparting a swirling flow of an upward gas stream through the guiding walls 9 are provided.

Figure 2:
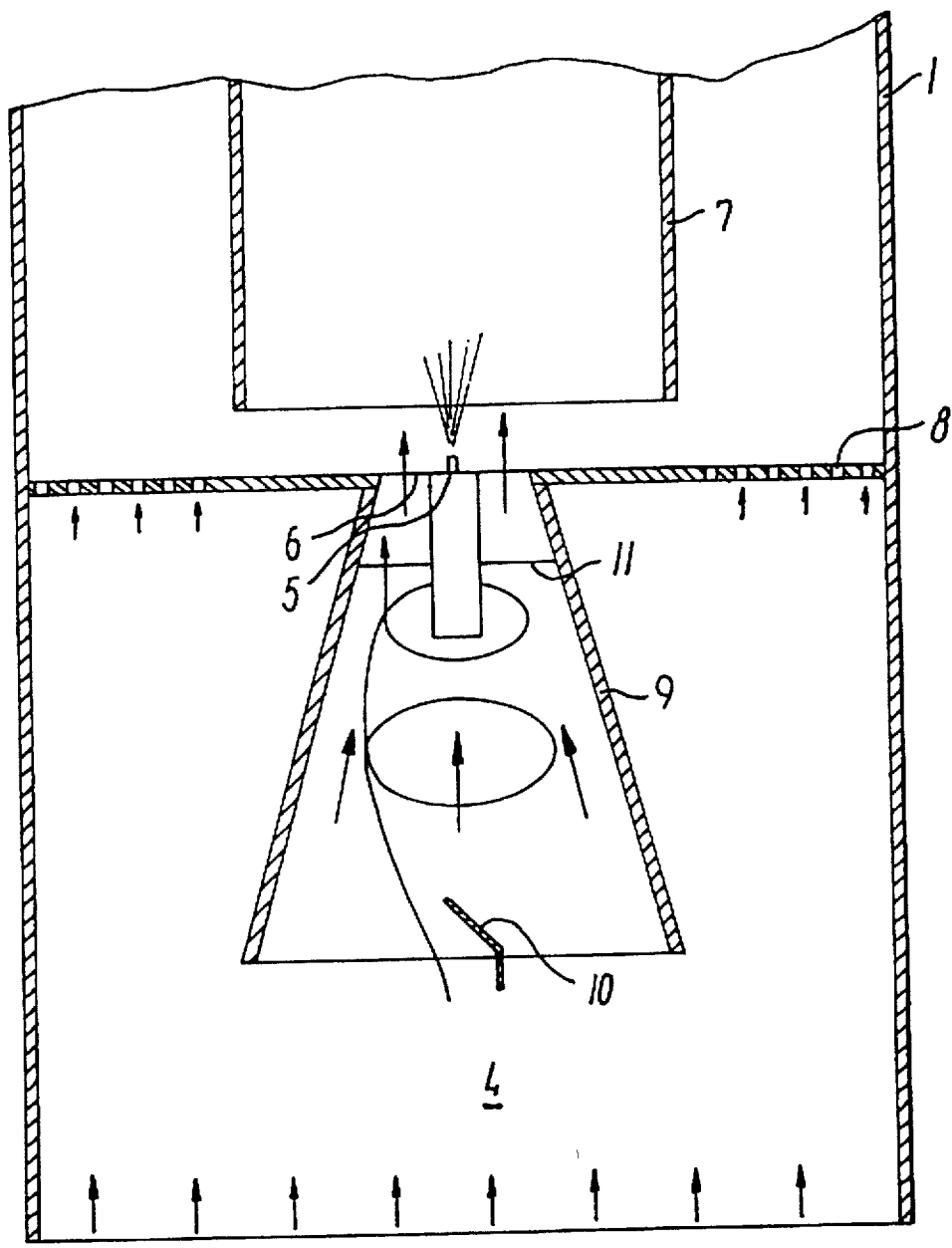
FIG. 2 is a schematic section of the central portion of an embodiment of the apparatus according to the invention, slightly different from the one shown in FIG. 1.
Figure 3:
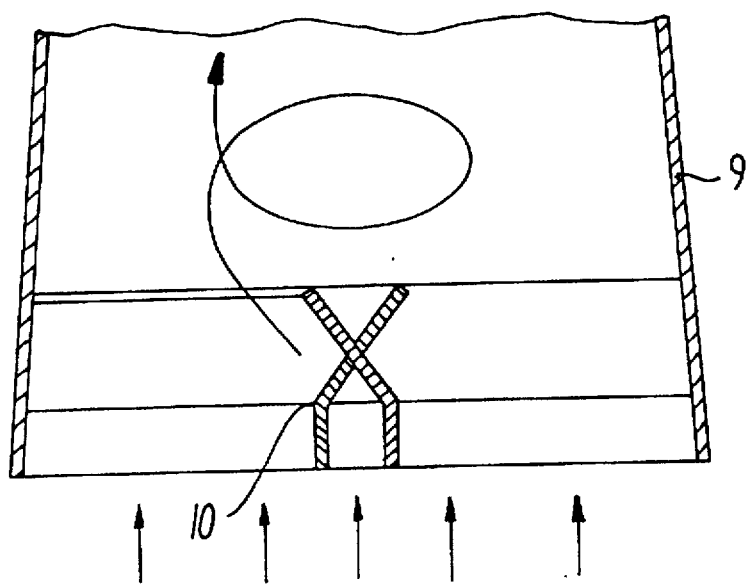
FIG. 3 is a partial section showing the swirl imparting means of the embodiment depicted in FIG. 2.
Figure 4:
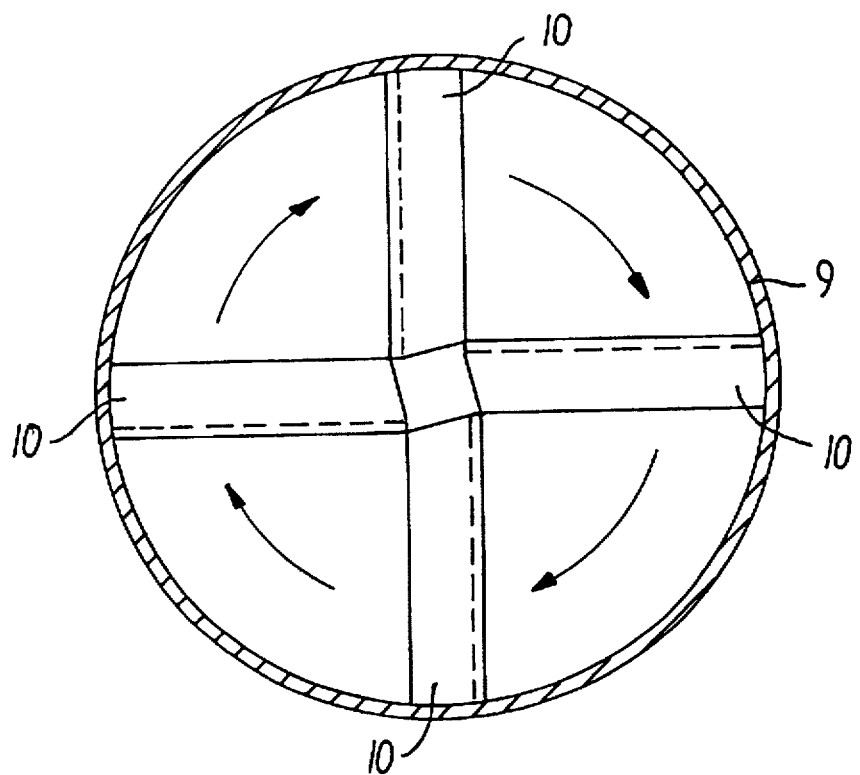
FIG. 4 is a horizontal section showing the same swirl imparting means as seen on FIG. 3.

Details of a possible embodiment of said means 10 appear from the FIGS. 2, 3 and 4.

Between the gas guiding walls 9 below the base plate 2, at a position between the annular aperture 6, but spaced therefrom, and the means 10 a horizontal net 11 is inserted. The function of this net is to catch particles falling down through the aperture 6 when function of the aparatus is interrupted.

The guiding walls 9 open up into the plenum 4 which receives gas from the duct 12.

In the presses specification and the attached claims the word "gas" is used in its broadest aspect, also including atmospheric air.

The ratio of the diameter of the cylinder 7 is typically only 2–6 times the outer diameter of the aperture 6, reflecting that the apparatus enables higher flow velocities through the coating pipe 7 than usually in the prior art apparatuses where the flow of gas through the pipe is provided by multiple perforations in the central area of the base plate.

In the top portion of the coating chamber 3, means (not shown) exist for preventing particles to be entrained by gas leaving the chamber through outlet 13.

In FIGS. 2, 3 or 4 it is illustrated how the means 10 for imparting the roating or swirling flow to the gas stream may be constructed. In the depicted version said means are formed by four elements, each having a vertical and a slanted section deflecting the air flow in the same direction. Obviously a greater or minor number of elements can be used for said purpose.

At the operation of the apparatus a pressure difference is created, either by introducing pressurized gas through duct 12 or by suction through outlet 3, and an upward gas stream is created between the guiding walls 9 and through the aperture 6. When this gas stream passes the means 10, for instance embodied as the elements shown in FIGS. 2, 3 and 4, it obtains a swirling flow pattern. During the upward passage between the walls 9 the available space decreases and consequently an acceleration takes place involving not only an increase of the velocity in upward direction but also an increase of the rotational velocity.

This acceleration has the beneficial effect of decreasing or actually removing the turbulence which unavoidably is created by the rotation-imparting means 10.

When the upward gas flow in the preferred embodiment reaches the net 11, a certain an turbulence is created again. However, this turbulence has a beneficial effect since it exerts an equalizing effect on the flow, and the turbulence created by the net is afterwards removed by the further acceleration taking place due to the restriction of the passage from the net to the aperture 6. It has turned out that the net does not decrease the rotation of the air flow to any detrimental degree.

In the following a description of the operation of an embodiment of the coating apparatus according to the invention is provided.

The particulate material to be coated, which can have a particle size from below 100 µm to several millimeters, is introduced into the coating chamber 3 through an inlet (not shown) whereupon it collects mainly in the zone outside the wall means 7, which zone is termed "the down-flow bed". Afterwards a stream of gas is provided from duct 12 through plenum 4. Also the atomization of the coating liquid through the nozzle 5 is started. The gas flows through the several small perforations 8 below the down-flow bed, whereby the material to be coated is kept in an aereated semi-fluidized state. Due to the small diameter of the perforations 8 is this semi-fluidization or lifting with gas not very intensive, and it serves only to prevent packing in the down-flow bed of the material to be coated and to keep this material somewhat in movement. However, the degree of fluidization desired is dependent on the actual product and can be varied from non-fluidized to full-fluidization.

The main portion of the gas from plenum 4 flows through the funnel-shaped opening through the gas guiding walls 9 between which walls the gas achieves a special flow pattern as explained above.

Axially in the gas stream passing the aperture 6 the nozzle injects a spray of atomized coating liquid, if the nozzle is a two-fluid nozzle also an upward stream of atomizing gas is delivered. Therefore, an upward rotating high-velocity gas stream is provided through the wall means 7, which as explained preferably are in the form of a pipe or a cylinder having circular cross-section. It could also be e.g. a truncated cone.

The portion of the base plate below said wall means and also a small ring-shaped extension of said portion outside the area under the wall means has no perforations or only few and small perforations for which reason horizontal movement of particles over that part of the base plate will not be disturbed. Due to the high flow velocity of the gas in the area above the aperture 6 and the non- or only low perforated annular area concentric thereto a minimal static pressure exists in the border zone. Therefore, the particles to be coated present in the down-flow bed outside the wall means 7 will move down through the slot between the base plate 2 and the wall means 7, and due to suction from the swirling upward air stream the particles will be moved inwards.

Figure 5:
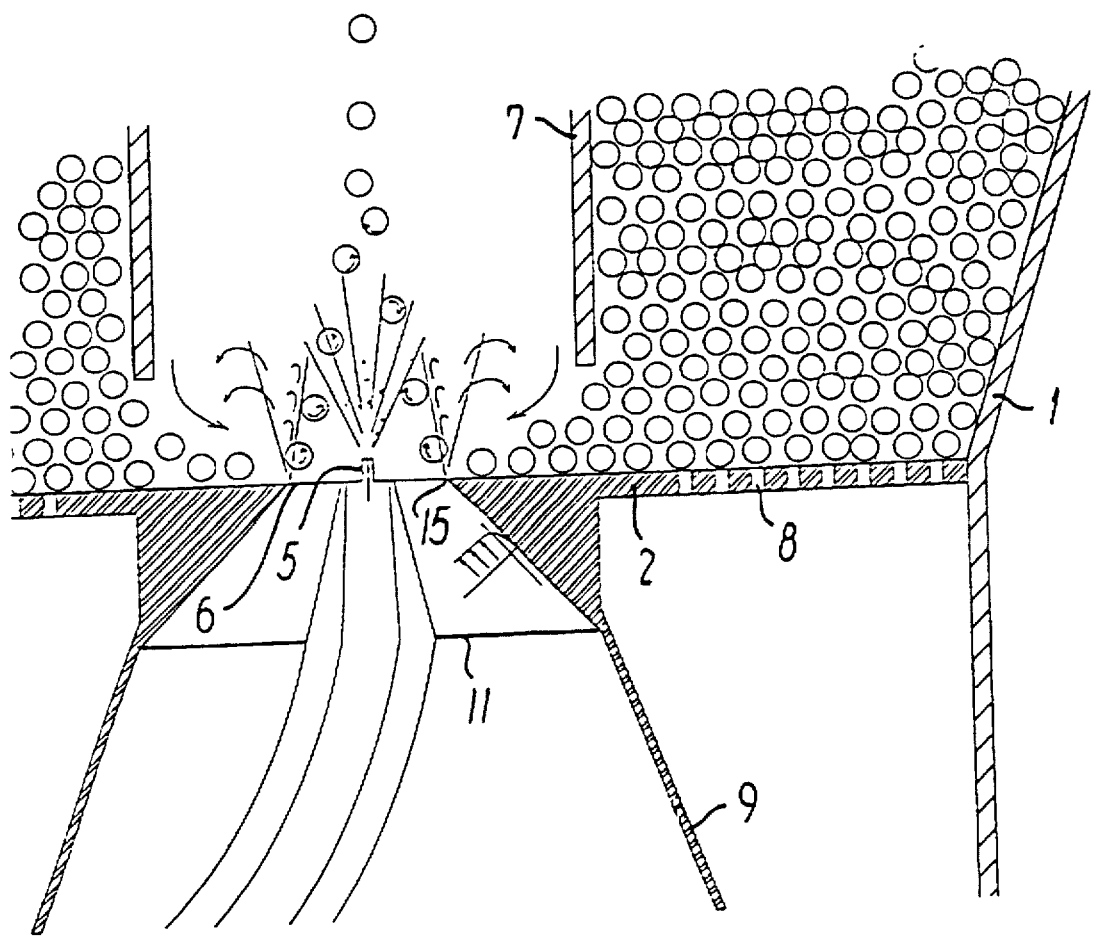
FIG. 5 is an enlarged portion of the section shown in FIG. 1.

The particle flow in this part of the apparatus is best seen on FIG. 5. The particles, which due to the above mentioned suction pass towards the aperture 6 along the base plate, receive a certain upward local blow at the side facing the nozzle when they reach the edge 15, immediately before being sucked completely into the upward swirling laminar high-velocity gas stream. Thereby each particle obtains a rotation, which increases the chances that a more even coating of the particles will be obtained during their subsequent passage through the cloud of atomized coating liquid above the nozzle. In the prior art apparatuses where the upward stream of gas through the coating pipe is provided through a plurality of perforations spaced over the area below the coating pipe, such a rotation of each particle cannot be expected to any substantial extent.

When the thus rotating particles pass through the coating pipe 7, they are wetted with a coating liquid. The wetted particles are carried by the gas out of the coating pipe and further up in the coating chamber 3, whereafter they again fall down in the down-flow bed encircling 7. During the movement of the wetted particles up into the chamber and back to the down-flow zone the applied coating is dried to such an extent that the gas stream through the perforations 8 is sufficient to avoid any agglomeration. The material to be coated is circulated between the down-flow bed, the coating pipe and the free space in the coating chamber until the desired thickness of the layer coated on the particles has been achieved, after which the treated material is removed from the chamber 3.

Figure 6:
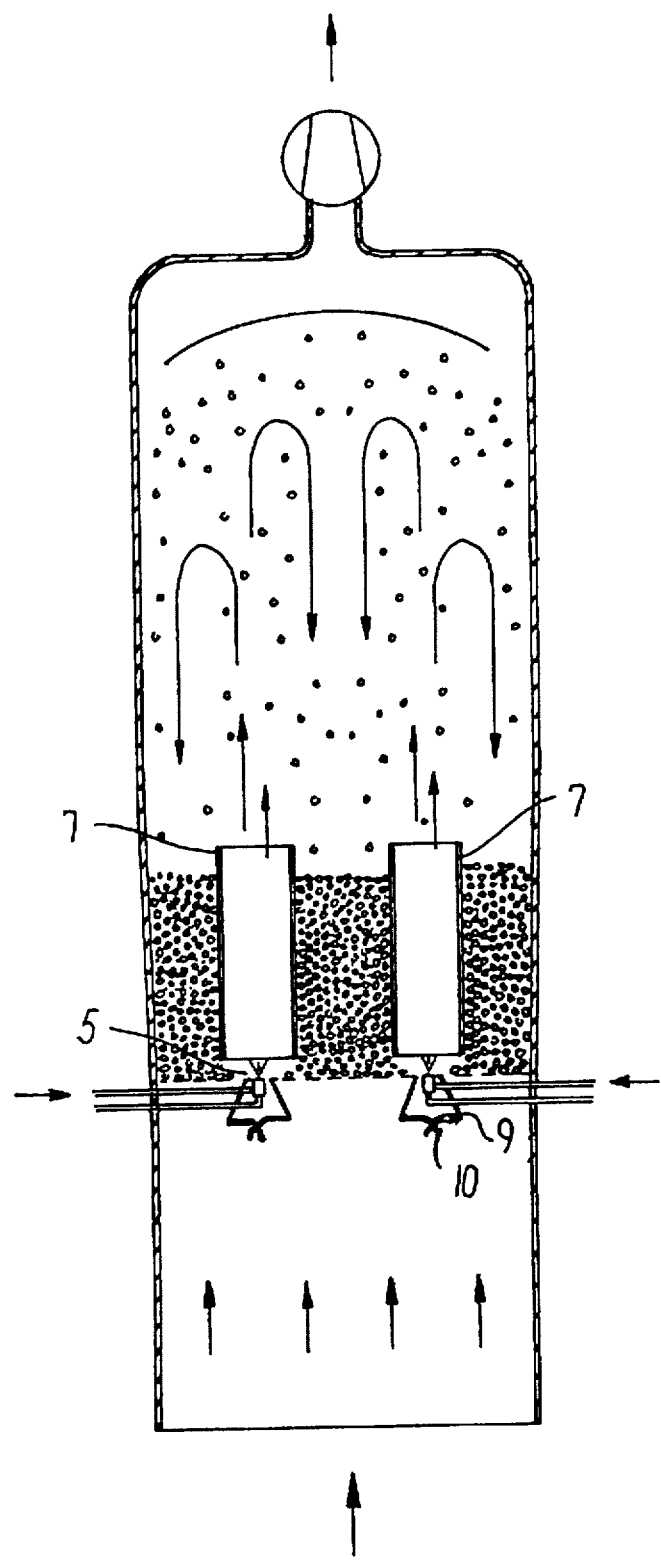
FIG. 6 is a schematic, vertical section through an embodiment of the apparatus according to the invention having a plurality of nozzles and coating pipes.
Figure 7:
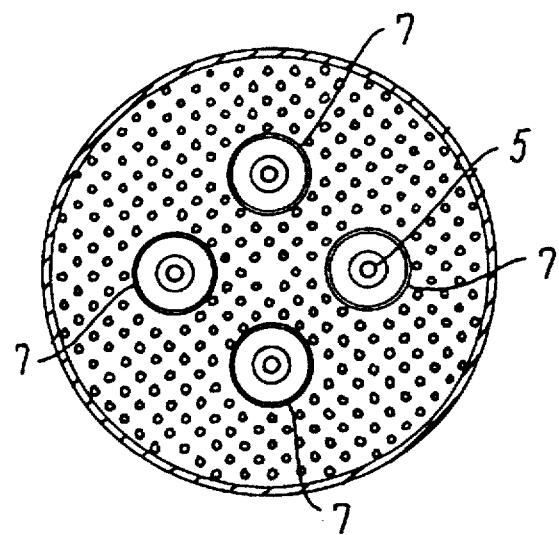
FIG. 7 is a horizontal section through the apparatus shown in FIG. 6.

In the embodiment having several coating units as shown in FIGS. 6 and 7 said units are placed on a common circular plate. However, it may also be of different shape. The particles to be coated circulates in substantially identical patterns in each coating unit so that each particle spends substantially the same time in the spray cloud whereby a uniform coating of high quality is obtained. At the same time a large treating capacity is obtained, and the apparatus can be operated without risk for agglomeration or nozzle clogging. Also the risk of varying flow resistance caused by packing of particles in one of the coating pipes is removed, and the attrition of the material to be coated is minimized due to the fact that the material only stays a relatively short time in the apparatus.

The invention is further illustrated by means of the following Example which shows the importance of the swirling flow of the central upward gas stream existing in the operation of the apparatus according to the invention.

EXAMPLE

Initially a charge (40 kgs) of particles (Non-pareils) was coated, using 20 kgs of 13.1% hydroxypropylmethylcellulose solution to which a red colorant was added.

The run (run A) was performed using an apparatus according to the invention, and the run was performed without any problems resulting in pellets which by visual examination appeared as being uniformly coated.

The resulting red coating had the ability of being insoluble in aqueous medium at pH above 1.

The resulting red pellets from this run A were divided into two portions B and C which were used in two different experiments in the following termed B and C.

Both these portions (each 20.3 kgs) were then coated using 36.5 kgs of 13.9% Eudragit suspension containing a white pigment which covered the originally applied red coating.

In Experiment B an apparatus according to the invention was used whereas in Experiment C the same apparatus was used but without means for swirling the air flow below the nozzle.

In both experiments samples were taken every twenty minutes, and said samples were subjected to a dissolution test according to US-Pharmacopeia (1990).

Figure 8:
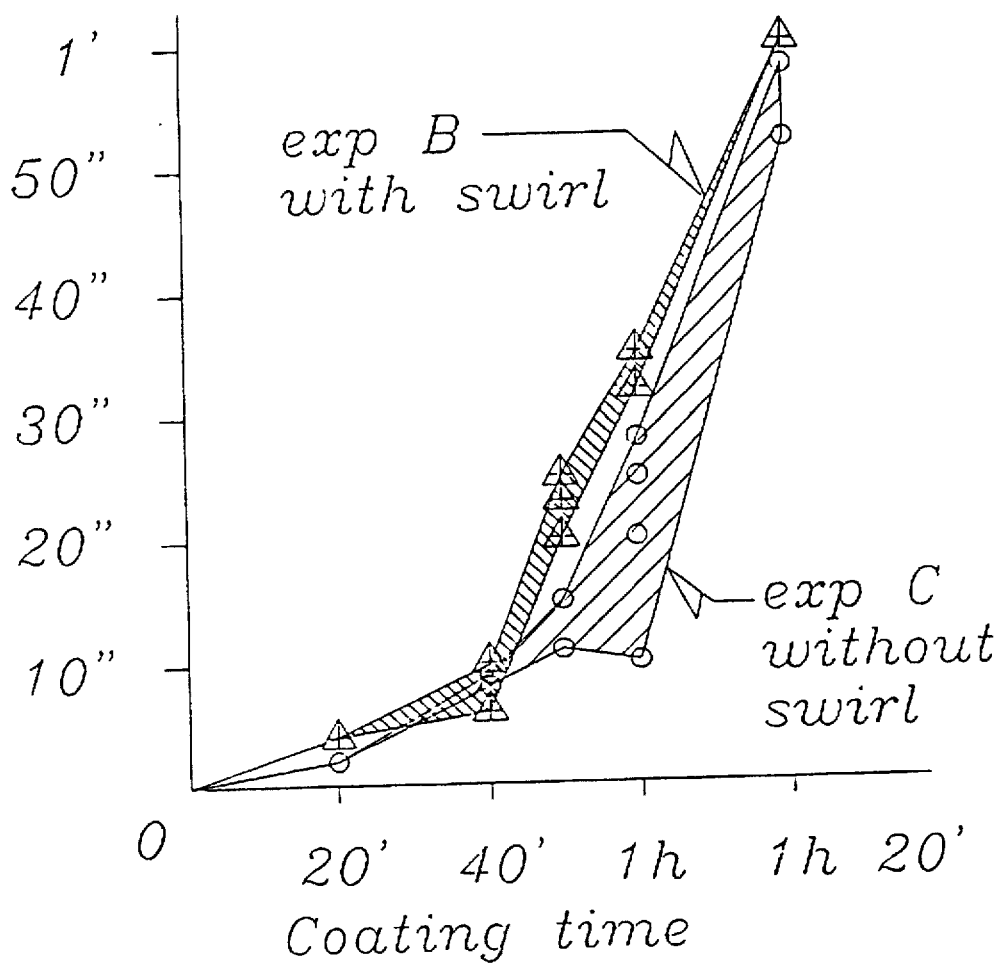
FIG. 8 shows graphs demonstrating the superior quality of the coating achieved by using the apparatus according to the invention.

The principle of this test is that the samples are treated with acid at pH 1. The time, which elapses until a red colour is detected, is measured and the results plotted as shown in. FIG. 8.

From the graphs in FIG. 8 it appears not only that in Experiment B with swirl of the air flow a more complete coating (as revealed by a longer time for the red colour to be detectable) is obtained at a certain coating time, but also, and may be more important, that the variation of the results obtained in Experiment B is less than the variations in Experiment C (without swirl).

Each dissolution test was made using 500 mg coated pellets corresponding to 15,000 pellets and it is surprising that especially the four results from the sample collected after a coating time of one hour differ from 10 seconds to nearly 30 seconds, indicating great variations as to the extend to which the white coating is able to protect the inner red coating from being dissolved by the acid.

In Experiment B, where the principle of the invention was utilized, this variation was substantially smaller.

Thus, it can be concluded that the product obtained in Experiment B was more evenly coated than the product of Experiment C.

Besides, it was observed that while Experiment B was conducted without any problems at all, minor problems occurred during Experiment C, in which a fluctating or pulsating particle flow was experienced and plugging of the nozzle occurred after a short operation, necessitating a short process interruption.

I claim:

1. An apparatus for coating solid particles comprising:

a housing including an upper coating chamber for containing the solid particles;

a base plate positioned and arranged at the bottom of the upper coating chamber;

at least one nozzle substantially at the level of said plate for discharging an upward spray of coating liquid into the coating chamber to coat the particles;

a rotation-symmetrical wall in the coating chamber positioned with an axis thereof in line with and vertically above said nozzle, said wall being spaced above said base plate;

means for providing an upward gas flow through a space defined by said wall, said means comprising an annular aperture between the base plate and the nozzle;

gas guiding walls located below the base plate and fitting to an edge of the annular aperture, said gas guiding walls defining a rotation symmetrical space having a downward expanding horizontal cross-section, said gas guiding walls being placed within a plenum connected to a source of gas at higher pressure than a pressure existing above the base plate; and means for imparting a swirling movement to an accelerating flow of gas stream upward between the guiding walls and through the annular aperture, said swirling movement means being located within the gas guiding walls in a horizontal cross-sectional area which is substantially larger than an area of the annular aperture and being located a distance from said annular aperture.

2. The apparatus of claim 1, wherein the base plate extends outside the area below the wall positioned above the nozzle, at least a portion of the plate outside said area being perforated to enable passage of gas from said plenum below the plate to a zone above the plate to increase flowability of solid particles to be coated present in said zone thereby promoting flow of the particles below said wall into a zone above the annular aperture.

3. The apparatus of claim 2, wherein an annular zone of the base plate comprising at least the area under the wall is without perforations or has substantially less and/or smaller perforations than said at least a portion of the plate outside said area.

4. The apparatus of claim 3, wherein the base plate has a conical shape downward tapering towards the annular aperture.

5. The apparatus of claim 2, wherein the base plate has a conical shape downward tapering towards the annular aperture.

6. The apparatus of claim 1, wherein the base plate has a conical shape downward tapering towards the annular aperture.

7. The apparatus according to claim 1, wherein said wall is a vertical cylinder in adjustable distance from the base plate.

8. The apparatus of claim 7, wherein the ratio of the diameter of the cylinder to the outer diameter of the annular aperture is 2–6.

9. The apparatus of claim 7, wherein the diameter of the cylinder is 10–15 cm.

10. The apparatus of claim 1, further comprising a horizontal net positioned between the gas guiding walls below the base plate at a position between the annular aperture, but spaced therefrom, and the means for imparting a swirling movement to the gas flow.

11. The apparatus of claim 1, wherein the ratio of the area of the lowest portion of the space between the gas guiding walls to the outer diameter of the annular aperture defined by the nozzle and the base plate is at least 2.

12. The apparatus according to claim 1 wherein the means for imparting a swirling flow to an accelerating stream of gas comprises a plurality of gas guiding elements which are combined at a center and spaced horizontally and symmetrically from there, each element consisting of a vertical member and a member slanted in relation thereto.

13. An apparatus for coating solid particles as defined in claim 1, comprising a plurality of said at least one nozzle distributed on a common plate in a common housing, an annular aperture being provided around each nozzle, a wall being provided above each annular aperture and swirl imparting means and gas guiding walls being provided below each annular aperture.

* * * * *